United States Patent

Angelucci

[11] Patent Number: 5,806,197
[45] Date of Patent: Sep. 15, 1998

[54] METHOD AND APPARATUS FOR OBTAINING PARALLEL LINES ON INCLINED PLANES

[76] Inventor: Anthony Angelucci, 7110-B Tabor Ave., Philadelphia, Pa. 19111

[21] Appl. No.: 568,246

[22] Filed: Dec. 6, 1995

[51] Int. Cl.⁶ .................................................. G01C 9/26
[52] U.S. Cl. ................................................ 33/451; 33/379
[58] Field of Search ............................ 33/390, 451, 365, 33/374, 375, 377, 379, 381, 389

[56] References Cited

U.S. PATENT DOCUMENTS

| | | |
|---|---|---|
| 63,807 | 4/1867 | Morrill . |
| 204,133 | 5/1878 | Chandler . |
| 313,292 | 3/1885 | Doherty . |
| 466,380 | 1/1892 | Spencer . |
| 564,449 | 7/1896 | Nickerson et al. . |
| 628,753 | 7/1899 | Brown et al. . |
| 685,569 | 10/1901 | Bullard . |
| 970,360 | 9/1910 | Whigham ................... 33/390 |
| 1,035,062 | 8/1912 | Vroome . |
| 1,101,319 | 6/1914 | Neff ............................ 33/389 |
| 1,221,644 | 4/1917 | Woods ........................ 33/375 |
| 1,258,597 | 3/1918 | Mladinich . |
| 1,448,031 | 3/1923 | Morris . |
| 2,385,424 | 9/1945 | Shue et al. ................. 33/215 |
| 2,464,911 | 3/1949 | White ....................... 33/215.2 |
| 2,659,975 | 11/1953 | Van Gundy ................ 33/374 |
| 2,659,976 | 11/1953 | Callahan ...................... 33/98 |
| 2,691,829 | 10/1954 | Arana ......................... 33/374 |
| 2,896,453 | 7/1959 | Ryan et al. ................. 33/381 |
| 3,545,091 | 12/1970 | Sebastiani ................... 33/207 |
| 3,707,772 | 1/1973 | Cotter ........................ 33/373 |
| 3,832,782 | 9/1974 | Johnson et al. .............. 33/88 |
| 3,916,531 | 11/1975 | Morton ...................... 33/390 |
| 3,950,860 | 4/1976 | Holcombe .................. 33/390 |
| 4,432,146 | 2/1984 | Klein ......................... 33/390 |
| 5,233,760 | 8/1993 | Patterson ................... 33/451 |

FOREIGN PATENT DOCUMENTS 2231151  11/1990  United Kingdom ..................... 33/389

*Primary Examiner*—Thomas B. Will
*Attorney, Agent, or Firm*—Eckert Seamans Cherin & Mellott

[57] ABSTRACT

A level tool is arranged to facilitate gradient measurement and matching of lines on inclined surfaces, such as to establish parallel reference lines when installing roofing materials. The tool has a rule-like base member defining an elongated reference edge, and has a centrally located protrusion on its lower surface and a level on its upper surface for sensing orientation of the tool around an axis perpendicular to the base member and to the level. The level can have a fluid filled disk or circularly arched tube with a captive air bubble, and preferably is graduated to mark positions of the bubble. The tool is placed on the inclined surface so that the raised protrusion rests against the inclined surface and a reference edge is parallel to the plane of the surface and aligned to a pre-existing line to be matched with a parallel line. The protrusion avoids the influence of bumps in the surface and allows the tool to be rolled transversely to bring the reference edge near or against the pre-existing line while tilting the level to move the bubble radially outwardly. The orientation of the tool is noted from the bubble position. When the tool is moved to a new location, set on the protrusion and oriented as noted, the reference edge is oriented to a line parallel to the pre-existing line.

20 Claims, 3 Drawing Sheets

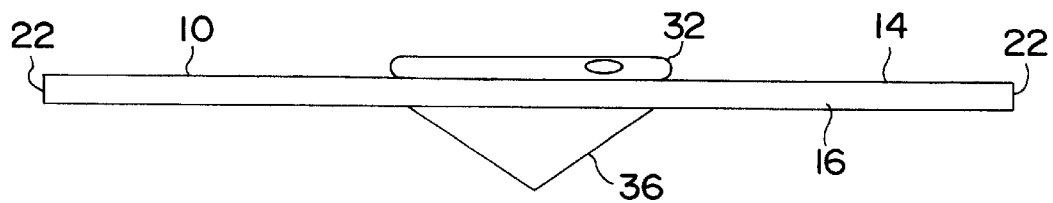
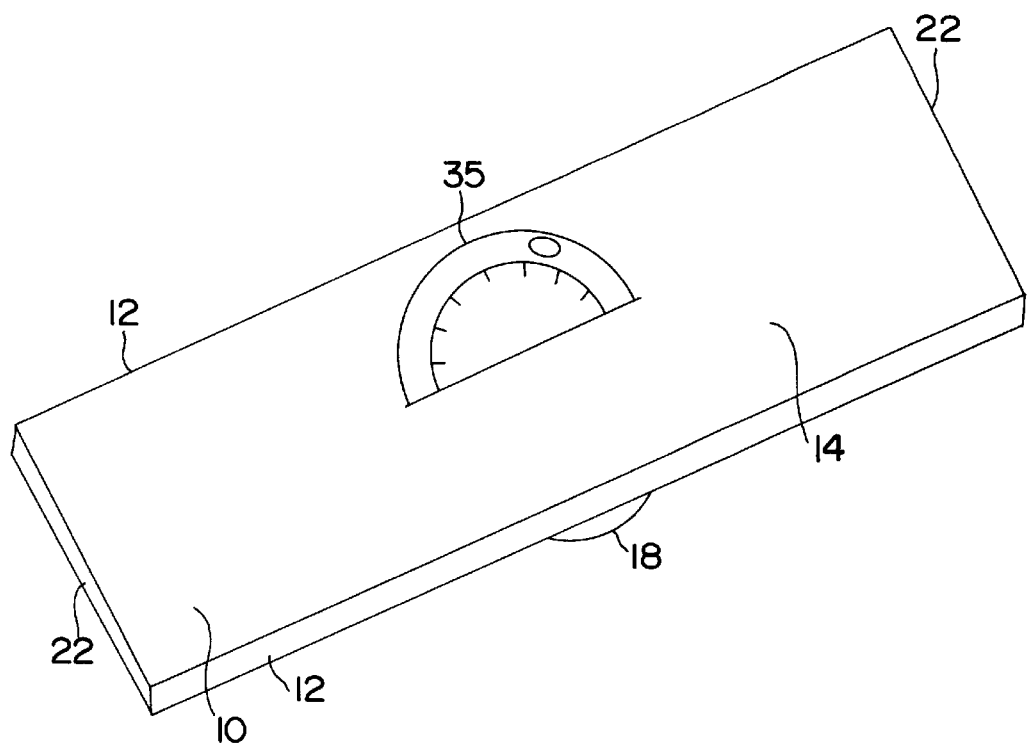
FIG. 5
FIG. 6

METHOD AND APPARATUS FOR OBTAINING PARALLEL LINES ON INCLINED PLANES

BACKGROUND OF THE INVENTION

1. Field of the Invention

The invention relates to the field of plumb and leveling equipment, and in particular concerns a device for use in conveniently obtaining or checking multiple parallel lines on an inclined plane, for example in connection with the installation of roofing materials.

2. Prior Art

In the building trades, it is often useful to obtain multiple reference lines which are used to align successive rows or courses of building materials. A builder may mark a series of parallel lines on a vertical exterior wall of a building prior to applying siding such as clapboards or shingles and the like. When applying siding to a vertical wall surface, it is preferable to employ reference lines that are horizontal (i.e., in a plane parallel to the horizon), parallel and evenly spaced. A first reference point is marked on the wall surface and a spirit level or the like, typically having a bubble in a curved fluid filled tube, is used to draw a horizontal line from the point to provide an initial reference line, for example by snapping a chalked line. The vertical position of the initial reference point is selected to locate the first row of siding or the like, typically called the starter course, accurately with respect to the horizontal edge of the structure, and for appearance purposes precisely horizontal.

For providing successive reference lines for the respective courses, a vertical measurement can be taken from two spaced points along the initial reference line, at a distance sufficient to provide the proper amount of exposure vs. overlap of the courses. These spaced points (which may be endpoints) are connected by snapping a chalked line and/or the line is otherwise extended horizontally. Horizontal lines can be readily drawn on a vertical surface using a carpenter's level. Using a level is more accurate than relying only on measurements from spaced points on a previous line, because measurements can introduce errors that are carried along into the successive courses and can be cumulative. To maintain horizontal courses as the work proceeds from the starter course, it is useful to check that the reference lines remain horizontal, at least for some of the successive reference lines.

This procedure can become more complicated in cases where the underlying base for the successive rows, or the edge of the structure, are other than vertical. In the roofing trade, the problem is compounded by the pitch of the roof, the possibility that the eaves or roof ridge may not be horizontal, the possibility of a gradient that is not in a vertical plane, the potential inclusion of additional configurations such as gables, dormers and the like, and the fact that the roof surface may have bumps and irregularities. It is desirable to obtain multiple parallel reference lines on an inclined roof surface, notwithstanding such difficulties, when installing shingles or other materials to the roof surface. This is necessary to maintain planned alignments of the courses with the eaves, the ridge of the roof, and with potential gradient change lines, for example, in gambrel roof configurations.

Several techniques can be used in an effort to obtain a series of parallel lines on an inclined surface such as a roof. For example, parallel lines can be established from a base line by using a tape measure to measure a fixed distance from the base line to a point. The measurement is repeated identically on each end of the roof. A chalk line is stretched between the two points and is used to snap a line which is parallel to the reference line. This process can be repeated multiple times to establish a series of parallel lines used for reference in applying courses of roof shingles and the like, but it relies on the structure being accurate, and any error introduced on a given course is carried along to successive courses.

U.S. Pat. No. 1,305,062—Vroome discloses a line holder which can be operated by a single person in order to snap three successive parallel chalk lines a predetermined distance apart. The line holder has a spring loaded pivoting arm which is operable to hold one end of a chalk line and is movable between three distinct positions where the line is successively struck. The line holder is useful for determining a reference line position on only one side of the roof. The operator must place the opposite end of the chalk line at the proper position when the line is struck, and thus must match the distance between the arm and a reference point on the first side, to avoid introducing an error.

For vertical surfaces, a spirit level is useful to double check lines at the later courses. However, strictly horizontal reference lines are not always the object, especially for an inclined surface such as a roof. Parallel lines at other angles may be desirable, for example, to match a non-horizontal edge along eaves or to mark an edge approaching a hip for installation of flashing, or for other purposes. These reference lines are difficult to obtain except by careful measurement from an initial reference line.

It would be desirable to verify the accuracy of parallel reference lines on a roof or the like, including lines other than horizontal ones, using a device that is as useful as a spirit level on a vertical wall. However, known spirit levels and mechanical gravity responsive levels are not useful on inclines, particularly if the gradient is partly diagonal, because it is not possible to distinguish between an indication that is due to variation of the level from the desired line in a plane parallel to that of the incline, and one due to variation of the level perpendicular to the plane of the incline. Most spirit levels and mechanical gravity responsive levels therefore are specifically designed to indicate a specific standard incline only, such as 0°, 45° or 90°, and are not helpful for matching any line on an inclined surface of an arbitrary pitch.

In connection with levelling apparatus, it is known to provide a form of level for determining horizontal alignment. An example is a level for a phonographic turntable. Such levels have a flat base for resting on the turntable or other surface and a quantity of liquid in a transparent domed receptacle with a circle or crosshair marking at the top center of the dome. A bubble in the liquid is aligned to the circle or crosshair marking when the surface is level, and is diverted in any direction around 360° when the surface is not level. Such levels have no point of reference other than the top center of the dome, where the bubble and circle or crosshair marking show the gradient direction.

Two levels arranged on perpendicular axes can be used to define the slope of an arbitrary line on an incline. U.S. Pat. No. 1,258,597—Mladinich, for example, discloses such a device with two pendulums on perpendicular pivot axes, a transverse axis pendulum being gimballed to a longitudinal axis pendulum. The pendulums indicate tilt on an axis parallel to a line of elongation of the tool, and on an axis transverse to the line of elongation, but the axes are spaced above the base of the device, and thus spaced above the surface of the incline. It would be possible to place the Mladinich device at a given point on the inclined plane and at a given alignment; to note the two angular readings; to move the device to a new location a distance away (preferably a measured distance); and, to adjust the device there to obtain the same two angles. Theoretically, this would produce parallel lines. However, it is unwieldy due to the two indicators. The readings of both indicators change simultaneously when moving the device in any direction other than rotating it around one of the axes. Whereas the axes are spaced above the base, the readings can be changed by lifting one end of the device.

In addition to the disadvantage that the operator is required to make two separate readings while hunting for the desired orientation of the device, another aspect is that the device has a flat base surface parallel to one of the axes, which must be rested on the surface to be measured. A roof surface may have variations in inclination, as well as imperfections such as cups, warps, high spots, low spots or other dimensional variations. Such variations affect the reading obtained from the tilt measuring device.

It would be desirable to provide a tool that can be used to obtain multiple parallel lines on an inclined surface without relying on a flat base that must rest against the roof surface, which has a single indicator, and which is read as conveniently as a spirit level.

SUMMARY OF THE INVENTION

It is an object of the invention to provide a level tool for inclined surfaces which requires the operator to take only a single measurement reading in order to obtain to establish or verify the angular position of at least one reference line.

It is also an object of the invention to provide a level tool for inclined surfaces which has a raised protrusion which contacts the inclined surface at essentially a single point, such that the ends of the tool are not raised or lowered due to imperfections in the surface and the like, that affect the local gradient.

It is also an object of the invention to provide a level tool for inclined surfaces which requires little or no mechanical calibration.

It is an object of the invention to provide a level tool for inclined surfaces which simple and durable and useful for repetitively determining parallel lines on an incline.

These and other objects are accomplished by a level tool having an elongated base member with at least one long edge and upper and lower surfaces, a centrally located protrusion on the lower surface of the base member and a centrally located level on to the upper surface of the base member. The level preferably is circularly symmetrical around a line perpendicular to the long edge, and resides over the protrusion. The level is generally fluid filled with a captive air bubble and has a plurality of graduation lines or marks, which in connection with the bubble indicate the angular position of the level tool. In operation the level tool is placed on the inclined surface so that the raised protrusion contacts the inclined surface and the upper surface of the base member is manually placed along a plane generally parallel to the inclined surface. The tool can be rolled transversely to tilt the level and to place one of the long edges near or against the inclined surface, where the long edge can be aligned with a pre-existing reference line. The measured angular orientation is read using the bubble and the graduations. The level tool can then be moved to a new location where a parallel line is to be located. The level tool is placed on the surface at the new location in the same manner, i.e., by resting the tool on the protrusion to reside in a plane parallel to the inclined surface. The base member is then rotated on the protrusion to obtain the previously noted orientation using the bubble and the graduations. A line parallel to the initial line then can be drawn or struck using one of the long edges of the tool as a guide.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 5 is a side view of another embodiment of the invention shown with a raised protrusion having a pointed lower surface.

FIG. 6 is a perspective view of another embodiment of the invention.

DETAILED DESCRIPTION OF THE PREFERRED EMBODIMENTS

Figure 1:
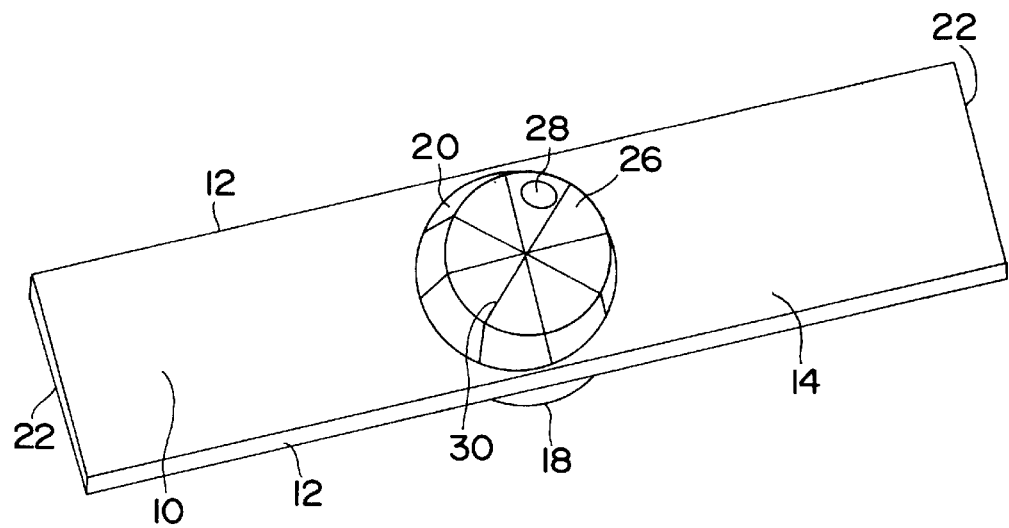
FIG. 1 is a perspective view of an embodiment of the invention shown with a circular level.

FIG. 1 shows an exemplary embodiment of the invention having a rectangular elongated base member 10 with an upper surface 14, a lower surface (16 in FIG. 2), long edges 12 and side edges 22. In this example the tool is shown as being relatively short, but a longer tool is possible.

Preferably the upper and lower surfaces define parallel planes, as do both opposite long edges. An at least partly circularly symmetrical level 20 is mounted on the upper surface 14 of base member 10. Variously shaped base members can be used provided a reference line of the tool is indicated along the line of elongation of the base member, such a line preferably being defined by long edges 12. The tool reference line can be aligned to a starting reference line, and also is used as a reference in striking or comparing a line parallel to the starting reference line.

Figure 2:
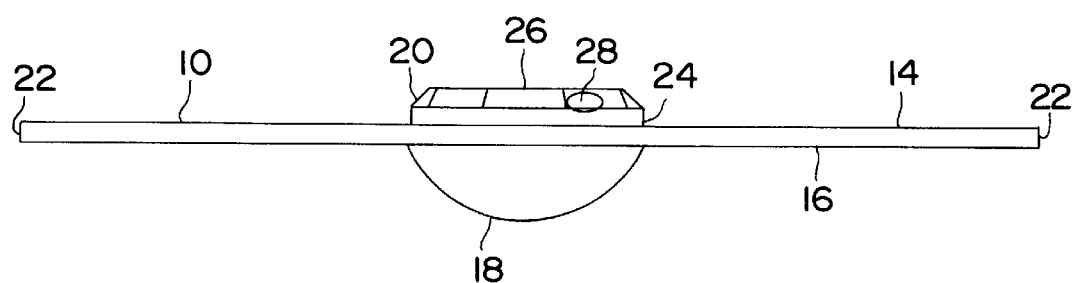
FIG. 2 is a side view of the embodiment shown in FIG. 1.

The liquid and bubble spirit level 20 as shown in FIGS. 1 and 2 comprises a circular bubble level arranged such that the bubble is free to move over an angular span. The top portion of the level is transparent, e.g., constructed of clear plastic material, has an exterior lower surface 24 which is attached to the base member. The upper surface 26 is marked with a plurality of associated graduations 30 extending radially, and in conjunction with the bubble indicate angles. The level has interior lower, upper and side surfaces which form an enclosed vessel containing a quantity of fluid and the captive air bubble 28. The bubble normally rests at least partially against the upper interior surface of the level, at a position spaced radially from the center and at an angular indicating position. Preferably the upper interior surface of the level is substantially flat, thereby causing the bubble to reside at the radial outside edge with minimal tilting of the tool, however a domed profile also can be used.

The level is preferably operable to measure angles around a full 360° rotation. If only a range of particular tilt angles are contemplated, other configurations can be used, including a partial circular level to measure only a portion of a full rotation, such as a quadrant or octant, or only on one 180° side (in which case the tool is turned around to measure on the other side).

The graduations 30 subdivide the level into segments, which in the example shown in FIGS. 1 and 2 are octants, namely 45°. The graduations can be marked on the upper surface of the level as shown in FIGS. 1 and 2 or alternatively marked on the upper surface of the base member. The level preferably is divided into a relatively large number of segments and the bubble diameter can be reduced accordingly. In addition to angles at which the bubble is between graduation lines, the tool can be used at angles where the bubble is aligned to a graduation line, or by interpolation, at an intermediate point. For good resolution, for example, the level can be divided into 36 segments, each containing 10°, and the bubble is selected to have a diameter approximately equal to the distance between successive graduations. This allows measurements accurate to at least ±2.5° by interpolation. Increasing the number of graduations is advantageous in that the accuracy of measurements is increased because of the increased resolution of the measurement scale, but normally a smaller bubble is appropriate for a larger number of graduations. Alternatively, as the number of graduations is increased, the diameter of the level can be increased to provide more space at the radially outer edge, such that the bubble position is readily readable. For smaller bubble sizes, the bubble functions more like a mechanical pointer. As an alternative to a bubble, a buoyant pointer such as a foamed polystyrene bead can be used.

A raised protrusion 18 is provided on the lower surface of base member 16. As shown in FIGS. 1 and 2, the raised protrusion can have a hemispherical rounded profile, or another profile can be used. The protrusion is such that when the protrusion is rested against an inclined surface, the tool can be inclined somewhat around the point of contact between the protrusion and the inclined surface. The opposite ends of the tool can be raised or lowered, and the tool can be rolled transverse to its line of elongation, in either direction. Preferably, the base member comprises an integral rectilinear bar, and the level and raised protrusion are attached to the base member on the upper and lower surfaces. The level and the protrusion are disposed at a point between the side edges 22 of the base member, preferably in alignment with one another at a point equidistant from the side edges.

Figure 3:
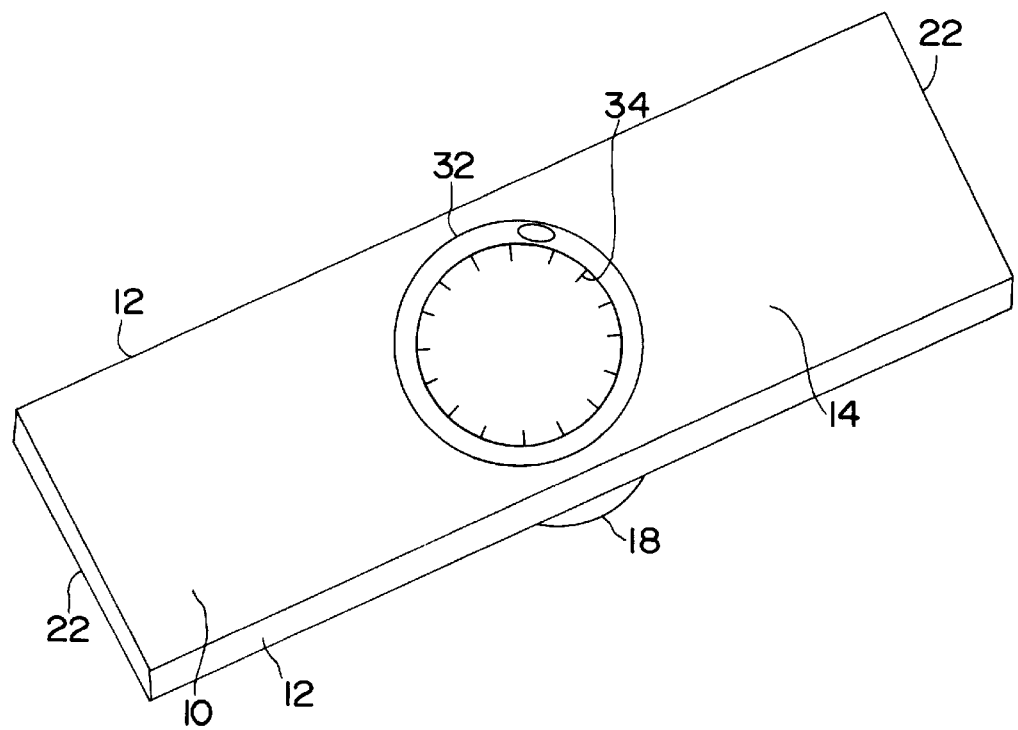
FIG. 3 is a perspective view of another embodiment of the invention shown with a circular tube spirit level.
Figure 4:
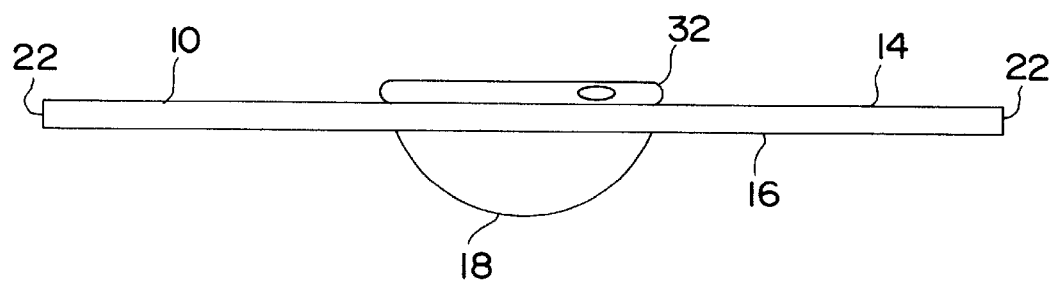
FIG. 4 is a side view of the embodiment shown in FIG. 3.

FIGS. 3 and 4 show an alternative embodiment having a circular tube spirit level 32. Conventional circular arc spirit levels have sides along the fluid filled vessel that are typically flat, and the upper radially outer surface typically is domed. This is not advantageous for use according to the invention. As a typical domed circular spirit level is rotated out of a horizontal position, the bubble contacts the sides and becomes deformed, changing the bubble shape and apparent size. A circular tube spirit level is preferred in that the fluid filled interior surface of the level is circular in cross section. The circular cross section of the level minimizes deformation of the bubble in that the interior sides approximate the circular shape of the bubble. The circular tube spirit level shown in FIGS. 3 and 4 can be formed of a circular cross-section of tubing disposed along a circular arc, however other configurations are also possible.

Sixteen graduations 34 are provided on the surface of the base member as shown in FIGS. 3 and 4. This embodiment thus has 16 incremental graduations each containing 22.5°. As discussed above, however, interpolation permits the user to judge smaller increments (e.g., half or quarter bubble widths, etc.), or alternatively the level can be divided into a relatively large number of segments and/or the bubble diameter can be reduced.

FIG. 6 shows an alternative embodiment having a partially circular level 35, which can measure from 0° to less than 180° of rotation.

FIG. 5 shows an alternative embodiment having a raised protrusion 36 with a conical shape. Other profiles can be used, but rounded or pointed profiles are preferred so that the raised protrusion contacts a flat inclined surface at essentially a single point.

The protrusion defines a point at which the tool can be rested against the inclined surface, which would normally be considered to defeat the purpose of measuring or matching a particular gradient line as needed to draw or check parallel lines. However, the protrusion has been found to have advantages. To avoid the influence of surface bumps and imperfections, the protrusion can support the body of the tool slightly above the surface, while the user manually positions the body substantially parallel to the surface to obtain a measurement or to strike a line. The tool can also be rolled transverse to the direction of elongation of the body, around the point of contact between the protrusion and the surface. This both brings one of the long side edges down toward the inclined surface or against the inclined surface, and causes the level on the side opposite from the protrusion to become inclined. Thus the bubble moves radially outwardly to the edge, facilitating a measurement. The invention is such that the tool can also be set fully on edge, in which case it can be used in the manner of a conventional level (i.e., without using the protrusion to space the tool from the surface). According to a preferred embodiment, the protrusion is substantially shorter than the length of the tool along its long axis, sufficient to clear bumps and imperfections but not substantially interfering with placement of the tool. Thus, the length of the tool can be thirty to fifty times the height of the protrusion.

The invention is useful to mark or verify multiple parallel lines on an inclined surface having an arbitrary gradient line, or for striking a single line having a given tilt angle. For this purpose, the tool can be used on an upper surface (e.g., incline roof) or an underside surface (e.g., a cathedral ceiling). A reference line is first established on the inclined surface by conventional means, for example by drawing a line at an exterior edge. The level tool is placed on the inclined surface so that only the raised protrusion contacts the inclined surface. One of the long edges is aligned with the reference line. The upper surface of the base member is manually positioned approximately in a plane parallel to the roof surface. It is advantageous that the invention only touch the inclined surface at a single point because variations in the inclined surface, such as high or low spots, do not affect the tilt position of the level in this manner. However, if the inclined surface is flat, the level can be rolled on the protrusion in a direction parallel to the line of elongation of the tool to set one of the long edges on the reference line. A measured angular position is then noted, using the correspondence of the center or an edge of the bubble with one or more of the graduation lines, which can be marked numerically or otherwise. It is also possible to interpolate between successive graduations and/or to split the difference in the width of the bubble and thus to increase the resolution of the measurement.

The level tool is then moved to the location where the parallel line is to be located. This may be a point along a line perpendicular to the previous reference line at a measured distance, for example corresponding to one course of roofing material. The level tool is placed on the inclined surface in the same manner on the raised protrusion. The base member is rotated so that the previously noted angular position is obtained again while holding the tool so as to intersect one of the reference edges, especially long edges 12 with the point along the new line, until the same correspondence of the bubble and the graduations is obtained. A parallel line then can be drawn or struck using one of the long straight edges as a guide, or assuming that an existing line is being checked, then the existing line can be compared to the alignment of the tool to check its parallelism with the previous reference line.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A level tool for an inclined surface, consisting essentially of:

an elongated base member having an upper surface and lower surface and opposite side edges;

a raised protrusion extending from the lower surface for supporting the base member above the inclined surface, the protrusion being spaced inwardly from at least one of the side edges of the base member; and a level attached to the upper surface of the base member, the level having an indicator operable to represent an angular position of the base member with respect to the inclined surface around at least a portion of a circular arc, whereby the tool can be supported on the protrusion above the inclined surface for repeatable alignment to a given gradient on the inclined surface.

2. The level tool of claim 1 wherein the upper and lower surfaces of the base member occupy parallel planes.

3. The level tool of claim 1 wherein the raised protrusion has an upper surface attached to the lower surface of the base member and a lower surface which is rounded.

4. The level tool of claim 1 wherein the raised protrusion has an upper surface attached to the lower surface of the base member and a lower surface which is pointed.

5. The level tool of claim 1 wherein the side edges are parallel and the raised protrusion is attached to the lower surface of the base member at a first point between said side edges, and the level is attached to the upper surface of the base member at a second point between said side edges.

6. The level tool of claim 1 wherein the side edges are parallel and the level and the protrusion are aligned with one another and equidistant from the side edges.

7. The level tool of claim 1 wherein the level has a movable indicator and a plurality of graduations which are used to read off the angular position of the indicator.

8. The level tool of claim 7 wherein the level is a fully circular level which can measure from 0° to 360° of rotation.

9. The level tool of claim 7 wherein the level is a partially circular level which can measure from 0° to less than 360° of rotation.

10. The level tool of claim 8 wherein the level is a spirit level.

11. The level tool of claim 9 wherein the level is circular tube spirit level.

12. The level tool of claim 1 wherein the base member has a length and the raised protrusion has a height wherein the length of the base member is approximately thirty to fifty times greater than the height of the raised protrusion.

13. A method of obtaining parallel lines on inclined surfaces comprising:

providing a level tool consisting essentially of an elongated base member with upper and lower surfaces and at least one straight edge, a raised protrusion attached to the lower surface and spaced from the straight edge, a level having a movable indicator and a plurality of graduations, the level being attached to the upper surface of the base member;

placing the level tool on the inclined surface such that the raised protrusion rests against the inclined surface;

aligning the at least one straight edge of the base member with a reference line on the inclined surface and aligning die base member so that the upper surface of the base member and the inclined surface define parallel planes;

reading a measured angular position of the level using the movable indicator and plurality of graduations;

moving the level tool a location where a parallel line is to be located and placing the level tool on the inclined surface such that only the raised protrusion contacts the inclined surface;

rotating the level tool until the measured angular position is obtained using the movable indicator and plurality of graduations and aligning the base member so that the upper surface of be base member and the inclined surface occupy parallel planes; and, defining a line parallel to the reference line using the at least one straight edge of the level tool.

14. The method of claim 13 wherein the base member has a length and the raised protrusion has a height wherein the length of the base member is approximately thirty to fifty times greater than the height of the raised protrusion.

15. A level tool for ail inclined surface, consisting essentially of:

an elongated base member having an upper surface and lower surface occupying parallel planes and at least one longitudinal side edge;

a raised protrusion spaced from the side edge, having at least one of hemispherical and conical shape, extending from the lower surface; and a level attached to the upper surface of the base member, the level having an indicator operable to represent an angular position of the base member with respect to the inclined surface around at least a portion of a circular arc, whereby the tool can be supported on the protrusion above the inclined surface for repeatable alignment to a given gradient on the inclined surface.

16. The level tool of claim 15 wherein the raised protrusion is hemispherical and rotatable on the inclined surface.

17. The level tool of claim 15 wherein the raised protrusion is conical and pivotable on the inclined surface.

18. The level tool of claim 15 wherein the base member has two parallel side edges and the raised protrusion is attached to the lower surface of the base member at a first point between said side edges, and the level is attached to the upper surface of the base member at a second point between said side edges.

19. The level tool of claim 15 wherein the indicator is movable and the level has a plurality of graduations which are used to read off the angular position of the indicator.

20. The level tool of claim 15 wherein the level is a fully circular level which can measure from 0° to 360° of rotation.

* * * * *